United States Patent
Eidson et al.

(10) Patent No.: US 7,231,005 B2
(45) Date of Patent: Jun. 12, 2007

(54) SYMBOL RELIABILITY DETERMINATION AND SYMBOL PRE-SELECTION BASED ON RELIABILITY CRITERIA

(75) Inventors: Donald Brian Eidson, San Diego, CA (US); Ramaswamy Murali, San Diego, CA (US); Abraham Krieger, San Diego, CA (US); Magnus H. Berggren, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 818 days.

(21) Appl. No.: 10/368,017

(22) Filed: Feb. 14, 2003

(65) Prior Publication Data
US 2004/0042566 A1    Mar. 4, 2004

Related U.S. Application Data

(63) Continuation-in-part of application No. 09/715,877, filed on Nov. 17, 2000, now Pat. No. 6,795,512.

(51) Int. Cl.
*H03D 1/00* (2006.01)
*H04L 27/06* (2006.01)

(52) U.S. Cl. ............... 375/341; 375/262; 375/265; 714/792; 714/794; 714/795

(58) Field of Classification Search ............. 375/341, 375/262, 265; 714/792, 794, 795
See application file for complete search history.

(56) References Cited

U.S. PATENT DOCUMENTS

| 6,023,783 | A | 2/2000 | Divsalar et al. | ............ 714/792 |
|---|---|---|---|---|
| 6,470,047 | B1 * | 10/2002 | Kleinerman et al. | ........ 375/232 |
| 6,677,865 | B1 * | 1/2004 | Xu | .............................. 341/50 |
| 6,769,093 | B1 * | 7/2004 | Krieger | ...................... 714/814 |
| 6,813,743 | B1 * | 11/2004 | Eidson | ....................... 714/795 |
| 2002/0122507 | A1 * | 9/2002 | Eidson | ....................... 375/340 |

OTHER PUBLICATIONS

Bahl, L. R., et al., *Optimal Decoding of Linear Codes for Minimizing Symbol Error Rate*; IEEE Transactions on Information Theory, Mar. 1974, pp. 284-287.

Benedetto, S., et al., *A Soft-Input Soft-Output Maximum A Posteriori (MAP) Module to Decode Parallel and Serial Concatenated Codes*; TDA Progress Report, 42-127, Nov. 1996, pp. 1-20.

Benedetto, S. and Montorsi, G., *Iterative decoding of serially concatenated convolutional codes*; Electronics Letters, vol. 32, No. 13, Jun. 1996, pp. 1186-1188.

(Continued)

*Primary Examiner*—Dac Ha
*Assistant Examiner*—Ted M. Wang
(74) *Attorney, Agent, or Firm*—Howrey LLP

(57) ABSTRACT

A method and apparatus for processing demodulated data comprising received symbol data is disclosed. A decoder is used to compute estimated symbols and corresponding reliability metrics. The reliability metrics are transformed into reliability weights. Optionally, residuals relating to the difference between the received symbol data and the estimated symbols are computed. Output data are generated comprising any combination of the following: estimated symbols, reliability weights, residuals, and received symbol data. The residuals may be weighted by the reliability metrics and used by demodulation or error compensation loops to instantaneously reduce or increase the bandwidth of these loops.

43 Claims, 7 Drawing Sheets

OTHER PUBLICATIONS

Benedetto, S. and Montorsi, G., *Serial concatenation of block and convolutional codes*; Electronics Letters, vol. 32, No. 10, May 1996, pp. 887-888.

Berrou, Claude, et al., *Near Shannon Limit Error—Correcting Coding and Decoding: Turbo-Codes (1)*; IEEE, May 1993, pp. 1064-1070.

Divsalar, D. and Pollara, F., *Serial and Hydrid Concatenated Codes with Applications*; Jet Propulsion Laboratory, California Institute of Technology, pp. 1-8.

Divsalar, D. and Pollara, F., *Turbo Trellis Coded Modulation with Iterative Decoding for Mobile Satellite Communications*; Jet Propulsion Laboratory, California Institute of Technology, pp. 1-7.

Hagenauer, Joachim and Hoeher, P., *A Viterbi Algorithm with Soft-Decision Outputs and its Applications*; Proceedings of IEEE Globecom '89; Dallas, Texas, Nov. 1989; pp. 47.1.1-47.1.7.

Hoeher, Peter and Lodge, John, *"Turbo DPSK": Iterative Differential PSK Demodulation and Channel Decoding*; IEEE Transactions on Communications, vol. 47, No. 6, Jun. 1999, pp. 837-843.

Narayanan, Krishna R. and Stüber, Gordon L., *A Serial Concatenation Approach to Iterative Demodulation and Decoding*; IEE Transactions on Communications, vol. 47, No. 7, Jul. 1999, pp. 956-961.

Robertson, P., et al., *A Comparison of Optimal and Sub-Optimal MAP Decoding Algorithms Operating in the Log Domain*; IEEE, 1995, pp. 1009-1013.

Viterbi, Andrew J., *An Intuitive Justification and a Simplified Implementation of the MAP Decoder for Convolutional Codes*; IEEE Journal on Selected Areas in Communications, vol. 16, No. 2, Feb. 1998, pp. 260-264.

\* cited by examiner

US 7,231,005 B2
SYMBOL RELIABILITY DETERMINATION AND SYMBOL PRE-SELECTION BASED ON RELIABILITY CRITERIA

CROSS REFERENCE TO RELATED APPLICATIONS

This application is a Continuation-in-Part (CIP) of commonly-assigned U.S. application Ser. No.: 09/715,877, filed Nov. 17, 2000 now U.S. Pat. No. 6,795,512, entitled "SYSTEM FOR CARRIER PHASE TRACKING OF CODED SYMBOLS USING RELIABILITY METRICS FOR SYMBOL ESTIMATES", hereby incorporated by reference herein for its teachings on symbol reliability and carrier phase tracking of coded symbols. This application claims the benefit of the priority filing date of U.S. application Ser. No.: 09/715,877 in accordance with 35 USC § 120. This application is also related to U.S. application Ser. No.: 09/729,652, filed Dec. 4, 2000, entitled "ITERATIVE CARRIER PHASE TRACKING SYSTEM"; and U.S. application Ser. No.: 09/738,896, filed Dec. 15, 2000, entitled "SYSTEM FOR CARRIER PHASE TRACKING OF MULTI-DIMENSIONAL CODED SYMBOLS". Each of these applications is commonly owned by the assignee hereof, and each is hereby fully incorporated by reference herein as though set forth in full, for their teachings on symbol reliability and carrier phase tracking.

BACKGROUND OF THE INVENTION

1. Field of the Invention

This invention relates to the field of communication data, and more particularly to methods and apparatus for determining symbol estimates and reliability weights, and for pre-selecting symbols based upon reliability criteria.

2. Description of Related Art

Assessing the reliability of received data is important in communication systems. For example, data reliability assessment is important when applying decision-assistance to demodulation tasks, such as carrier phase tracking and equalization. This is particularly true when the demodulator precedes a turbo decoder, and the system is operating at very low symbol-to-noise ratios. In this case the symbol error rates can become so large that the demodulation process is severely degraded, and consequently the decision-directed demodulation process becomes undesirable.

Under such conditions, symbol pre-selection becomes desirable. When a symbol decision is highly likely to be error-free, it is desirable to use the associated datum for further processing. When a symbol decision is unlikely to be error-free, it is desirable not to use the associated datum. It is desirable to avoid using errored data because harm caused by bad data may exceed the benefit provided by good data.

Decision-assisted data processing can be enhanced if the reliability assessment of symbol data is provided in a soft format, such as a linear probability with a range of values between 0 and 1, inclusive. This enables the decision-assisted process to "weight", or equivalently, to "pre-select" symbol data prior to subsequent processing.

Therefore, a need exists for a method and apparatus for providing soft reliability determination of received data, and for pre-selecting symbol data based on reliability criteria.

SUMMARY OF THE INVENTION

The present invention relates to apparatus and methods of estimating symbol data and determining symbol reliability weights. The present invention also relates to apparatus and methods of pre-selecting symbol data according to symbol reliability criteria. Pre-selecting symbol data may involve either "hard" or "soft" reliability determination, responsive to reliability weights. In an example of a hard reliability determination, a reliability weight may be either 1 or 0, and the corresponding symbol data are used or discarded, respectively. In an example of a soft reliability determination, a reliability weight ranging between 0 and 1, inclusive, may be used as a factor for subsequent signal processing using corresponding symbol data. Pre-selection techniques involving a combination of both hard and soft determination is also used in accordance with the present invention.

In one embodiment, a log-MAP decoder is used to compute the log-likelihood ("LL") values for all possible decoded symbols corresponding to received symbol data $r_k$. The maximum log-likelihood $LL_k(\hat{s}_k)$ corresponding to the most likely estimated symbol $\hat{s}_k$ is determined. A linear probability $P_k$ is computed in accordance with the expression: $p_k = e^{LL_k(\hat{s}_k)}$. The linear probability $p_k$ is compared to a selected threshold T corresponding to a minimum acceptable data reliability. A reliability weight $R_k$ is determined depending on whether $p_k$ is greater than T. If $p_k$ is not greater than T, then $R_k$ is set equal to 0. If $p_k$ is greater than T, then $R_k$ is set equal to a value or expression other than zero. Examples include, without limitation, the following values and expressions: $R_k=1$; $R_k=p_k$; and $R_k=(p_k-T)/(1-T)$. Optionally, a residual $z_k$ value, relating to the difference between $\hat{s}_k$ and $r_k$, may be computed. Output data are provided that comprise any combination of the following: $\hat{s}_k$, $R_k$, $z_k$, $r_k$.

In another embodiment, data comprising symbols $r_k$ are decoded by any device capable of producing soft symbol estimates, including, without limitation, a MAP decoder, a log-MAP decoder, a Soft-Input, Soft-Output decoder, a Soft-Output Viterbi Algorithm decoder, a max-log MAP decoder, or the like. Decoding may also be performed by a Viterbi decoder where a reliability metric is derived from the best path metric, minus the second-best path metric. An estimated symbol $\hat{s}_k$ and a reliability metric $RM_k$ are determined for a received symbol $r_k$. The reliability metric may, for example, be a maximum log-likelihood value. A probability metric, $p_k$, corresponding to the estimated symbol $\hat{s}_k$, is computed by a method that may, for example, include steps for computing a probability metric, $p_k$, taught herein above. Alternatively, other methods for computing a probability metric, $p_k$, may be employed. A reliability weight, $R_k$, is determined, depending on whether $p_k$ is greater than T. If $p_k$ is not greater than T, then $R_k$ is set equal to 0. If $p_k$ is greater than T, then $R_k$ is set equal to a value or expression other than zero. Examples include, without limitation, the following values and expressions: $R_k=1$; $R_k=p_k$; and $R_k=(p_k-T)/(1-T)$. Optionally, a residual value, $z_k$, relating to the difference between $\hat{s}_k$ and $r_k$, may be computed. Output data are provided that comprise any combination of the following: $\hat{s}_k$, $R_k$, $z_k$, $r_k$.

In yet another embodiment of the present invention, data comprising symbols $r_k$ are decoded by any device including, without limitation, a MAP decoder, a log-MAP decoder, a Soft-Input, Soft-Output decoder, a Soft-Output Viterbi Algorithm decoder, a max-log MAP decoder, a Viterbi decoder, or the like. An estimated symbol, $\hat{s}_k$, is determined for a received symbol $r_k$. The estimated symbol, $\hat{s}_k$, is compared to an uncoded symbol estimate, $\hat{u}_k$. The term "uncoded symbol estimate" is used here to denote a symbol estimate determined without reference to the data code structure. For example, an uncoded symbol estimate, $\hat{u}_k$, may be determined by selecting the symbol corresponding to a point in the signalling constellation that most closely approximates the received symbol data, $r_k$. If $\hat{s}_k = \hat{u}_k$, then a reliability weight $R_k=1$ is assigned corresponding to the estimated symbol $\hat{s}_k$. If $\hat{s}_k \neq \hat{u}_k$, then a reliability weight $R_k=0$ is assigned. Optionally, a residual value, $z_k$, relating to the difference between $\hat{s}_k$ and $r_k$, may be computed. Output data are provided that may comprise any combination of the following: $\hat{s}_k, R_k, z_k, r_k$.

BRIEF DESCRIPTION OF THE DRAWINGS

Like reference numbers and designations in the various drawings indicate like elements.

DETAILED DESCRIPTION

Throughout this description, embodiments and variations are described for the purpose of illustrating uses and implementations of the invention. The illustrative description should be understood as presenting examples of the invention, rather than as limiting the scope of the invention.

Figure 1:
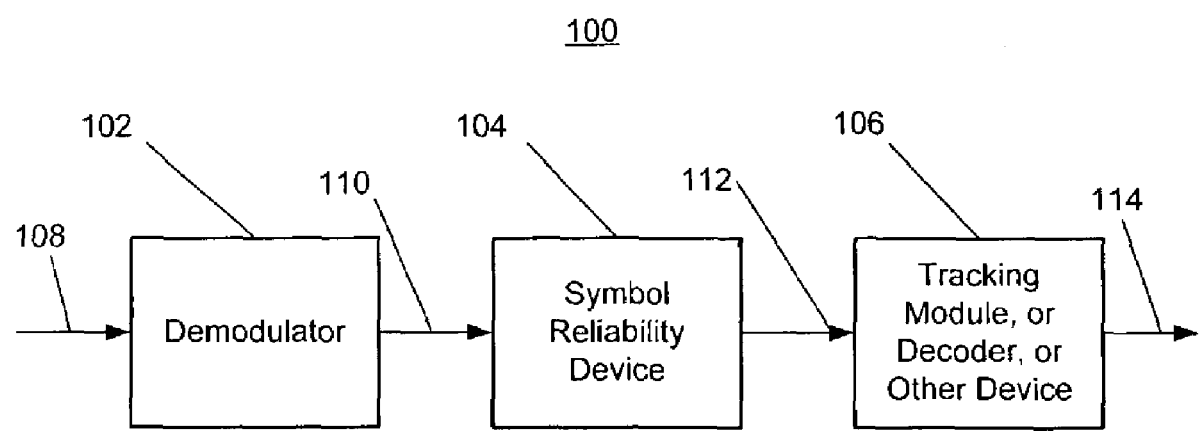
FIG. 1 is a block diagram of a receiver circuit incorporating a symbol reliability device.

FIG. 1 shows a simple block diagram of an inventive receiver 100, including a symbol reliability device 104. Modulated channel symbol data 108 are received over a communications channel and demodulated by a demodulator 102. Demodulated data 110 comprise received symbols $r_k$. A symbol reliability device 104 performs symbol reliability operations as described hereinbelow to output data 112. Data 112 may comprise any combination of the following: estimated symbols $\hat{s}_k$ reliability weights $R_k$, received symbols $r_k$, residual values $z_k$. Data 112 are provided as input to a receiver module or device 106 as shown in FIG. 1. For example, data 112 can be provided to modules for tracking carrier signal phase as taught in the above-incorporated U.S. patent applications Ser. No.: 09/715,877, filed on Nov. 17, 2000, entitled "SYSTEM FOR CARRIER PHASE TRACKING OF CODED SYMBOLS USING RELIABILITY METRICS FOR SYMBOL ESTIMATES"; Ser. No.: 09/729,652, filed Dec. 4, 2000, entitled "ITERATIVE CARRIER PHASE TRACKING SYSTEM"; and Ser. No.: 09/738,896, filed Dec. 15, 2000, entitled "SYSTEM FOR CARRIER PHASE TRACKING OF MULTI-DIMENSIONAL CODED SYMBOLS." Additional information and examples relating to the use of symbol reliability data is provided hereinbelow. The tracking module 106 output signal data 114 for subsequent use.

In one embodiment of the present invention, the system reliability device 104 includes a "maximum a posteriori" (MAP) decoder or log-MAP decoder. MAP decoding and log-MAP decoding relate to an optimal method for decoding linear block and convolutional codes to minimize symbol error probability. One reference that teaches principles of MAP decoding is entitled "Optimal Decoding of Linear Codes for Minimizing Symbol Error Rate," by L. R. Bahl et al., IEEE Transactions on Information Theory, March 1974, pp. 27–30 (hereinafter referred to as "the Bahl reference"). Additional information on MAP and log-MAP decoders can be found in the following references: "Near Shannon Limit Error-Correcting Coding and Decoding: Turbo Codes," C. Berrou et al., Proc. ICC '93 Geneva, Switzerland, May 1993, pp. 1064–1070 (hereinafter referred to as "the Berrou reference"); "An Intuitive Justification and a Simplified Implementation of the MAP Decoder for Convolutional Codes," A. Viterbi, IEEE Journal On Selected Areas In Telecommunications, Vol. 16, No. 2, February 1998, pp. 260–264 (hereinafter referred to as "the Viterbi reference"); and J. Hagenauer and P. Hoeher, "A Viterbi Algorithm with Soft-decision Outputs and its Applications," in Proceedings of IEEE Globecom '89, Dallas, Tex., November 1989, pp. 47.1.1–47.1.7. ("the Hagenauer reference"). Each of the Bahl, Berrou, Viterbi, and Hagenauer references is hereby fully incorporated by reference herein as though set forth in full for teachings on log-MAP decoding. Exemplary use of log-MAP decoding in accordance with the present invention is specified hereinbelow.

Figure 2:
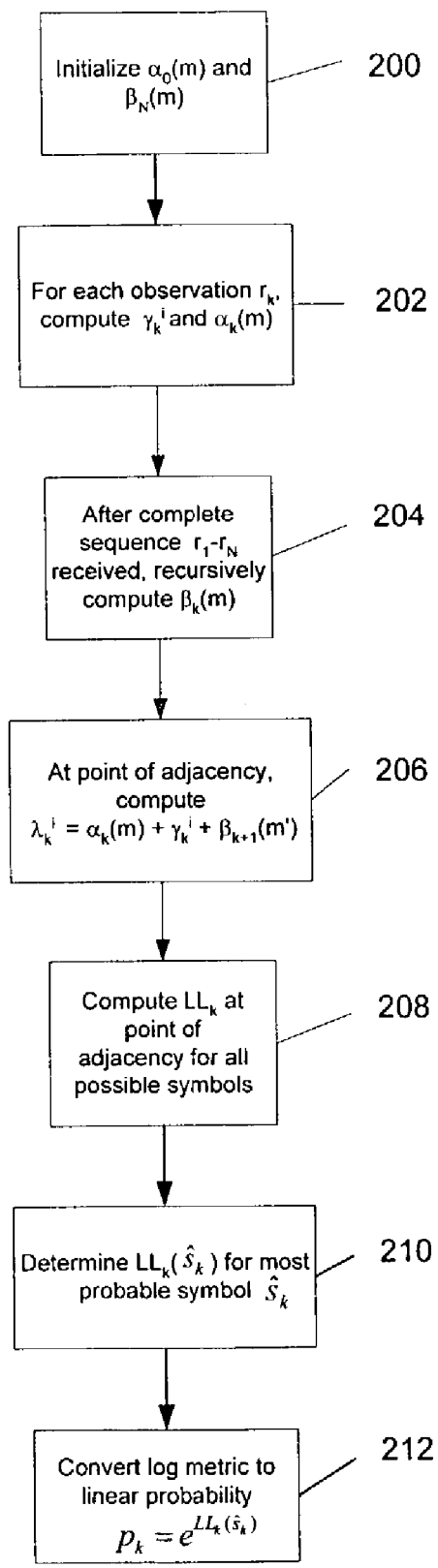
FIG. 2 is a flow diagram showing an exemplary method for determining symbol estimates and reliability probability metrics.

FIG. 2 shows an inventive method of using log-MAP decoding for estimating symbols and symbol reliability in accordance with the present invention. In the flowchart shown in FIG. 2, the notation "$\alpha_k(m)$" refers to the natural log domain (hereinafter referred to as the "log domain") forward probability of being in state "m" at a time "k"; $\gamma_k^i$ refers to the log domain edge probability for edge i at time k; and $\beta_k(m)$ refers to the log domain reverse probability of being in state m at a time k. It is assumed for purposes of the flow chart shown in FIG. 2 that a block of N channel symbols has been or will be received.

In step 200, the boundary values $\alpha_0(m)$ and $\beta_N(m)$ are initialized for all values of m. One example of suitable boundary values are given as follows: $\alpha_0(0)=0$ and $\alpha_0(m) = -\infty$ for $m \neq 0$; $\beta_N(0)=0$ and $\beta_N(m)=-\infty$ for $m \neq 0$. Other suitable initialization values and methods are possible, as those of ordinary skill in the symbol reliability determination arts shall recognize.

In step 202, for an observation $r_k$, $\alpha_k(m)$ and $\gamma_k^i$ are computed for all values of m and i. Note that the observation $r_k$ is a channel symbol as perturbed by noise through passage through the channel. In one embodiment, the forward probabilities $\alpha_k(m)$ are computed recursively as a function of $\alpha_{k-1}(m)$ in accordance with the example described below with reference to FIG. 3.

Figure 3:
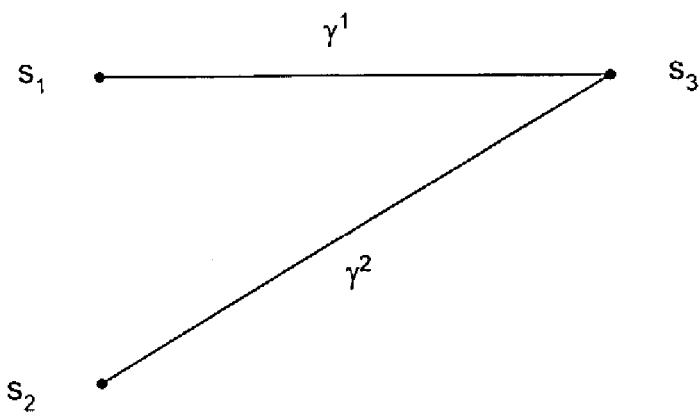
FIG. 3 is an example of a calculation of a forward state probability.

An example of the computation of forward probabilities is illustrated in FIG. 3. In this example, there are two permissible branches into state $s_3$, one from state $s_1$ and one from state $s_2$. The log domain probability of $s_1$, $\alpha(1)$, and the log domain probability of $s_2$, $\alpha(2)$, have been previously determined. Similarly, the log domain edge probabilities $\gamma^1$ and $\gamma^2$ have been previously determined. The objective is to compute the log domain probability of the state $s_3$, $\alpha(3)$, from the foregoing parameters.

In this example, the calculation of the probability α(3) can be expressed using the following equation:

$$\alpha(3) = MAX^*(\alpha(1)+\gamma^1, \alpha(2)+\gamma^2)$$

where the function MAX*(A,B) is defined to be:

$$MAX^*(A,B) = MAX(A,B) + \ln(1+\exp(-|A-B|))$$

Figure 4:
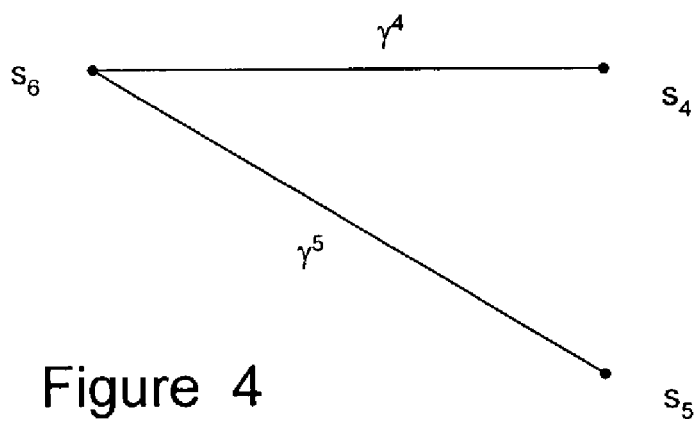
FIG. 4 is an example of a calculation of a reverse state probability.

Referring again to FIG. 2, in step 204, the reverse probabilities $\beta_k(m)$ are computed for all values of m. The probabilities $\beta_k(m)$ are computed recursively as a function of $\beta_{k+1}(m)$ in accordance with the following example described below with reference to FIG. 4. An example of the computation of reverse probabilities is illustrated in FIG. 4. In this example, there are two permissible branches into state $s_6$, one from state $s_4$ and one from state $s_5$. The log domain probability of $s_4$, $\beta(4)$, and the log domain probability of $s_5$, $\beta(5)$, have been previously determined. Similarly, the log domain edge probabilities $\gamma^4$ and $\gamma^5$ have been previously determined. The objective is to compute the log domain probability of the state $s_6$, $\beta(6)$, from the foregoing parameters.

In this example, the calculation of the natural log domain probability $\beta(6)$ can be expressed using the following equation:

$$\beta(6) = MAX^*(\beta(4)+\gamma^4, \beta(5)+\gamma^5)$$

where the function MAX*(A, B) is defined as before.

Figure 5:
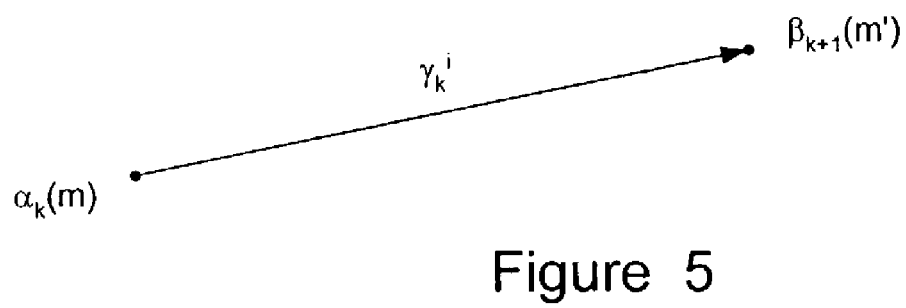
FIG. 5 is an example of a calculation of a forward transition probability.

Referring again to FIG. 2, in step 206, at the point where the computation of the forward and reverse probabilities begins to overlap, i.e., a point of adjacency, the joint log domain probabilities $\lambda_k^i = \alpha_k(m) + \gamma_k^i + \beta_{k+1}(m')$ are computed for all edges at the point of overlap. An example of this computation is described with reference to FIG. 5. Referring to the leftmost state as state m at time k, and the rightmost state as state m' at time k+1, it is assumed that the forward state log domain probability $\alpha_k(m)$, the reverse state log domain probability $\beta_{k+1}(m')$, and the edge log domain probability $\gamma_k^i$ have all been computed. This step involves adding these probabilities, i.e., performing the computation $\lambda_k^i = \alpha_k(m) + \gamma_k^i + \beta_{k+1}(m')$ in order to compute the joint log domain probability of transitioning between the two states along the prescribed edge.

Referring again to FIG. 2, in step 208, a log-likelihood, $LL_k$, is determined for the symbols at the point of adjacency k. The log-likelihood for a symbol s at time k, $LL_k(s)$, may be expressed by the following equation:

$$LL_k(s) = MAX^*_{\forall i \text{ that imply release of symbol } s}(\lambda_k^i) - MAX^*_{\forall i}(\lambda_k^i)$$

In step 210, an estimate $\hat{s}_k$ of the symbol at the point of adjacency k is taken to be $\hat{s}_k$ that has the largest LL value. This condition may be expressed as follows:

$$LL_k(\hat{s}_k) = MAX_{\forall s}(LL_k(s))$$

In step 212, a linear probability for the symbol estimate $\hat{s}_k$ is derived from $LL_k(\hat{s}_k)$ as follows:

$$p_k = e^{LL_k(\hat{s}_k)}$$

where $p_k$ is the linear probability for the symbol estimate $\hat{s}_k$ at time k.

Figure 6:
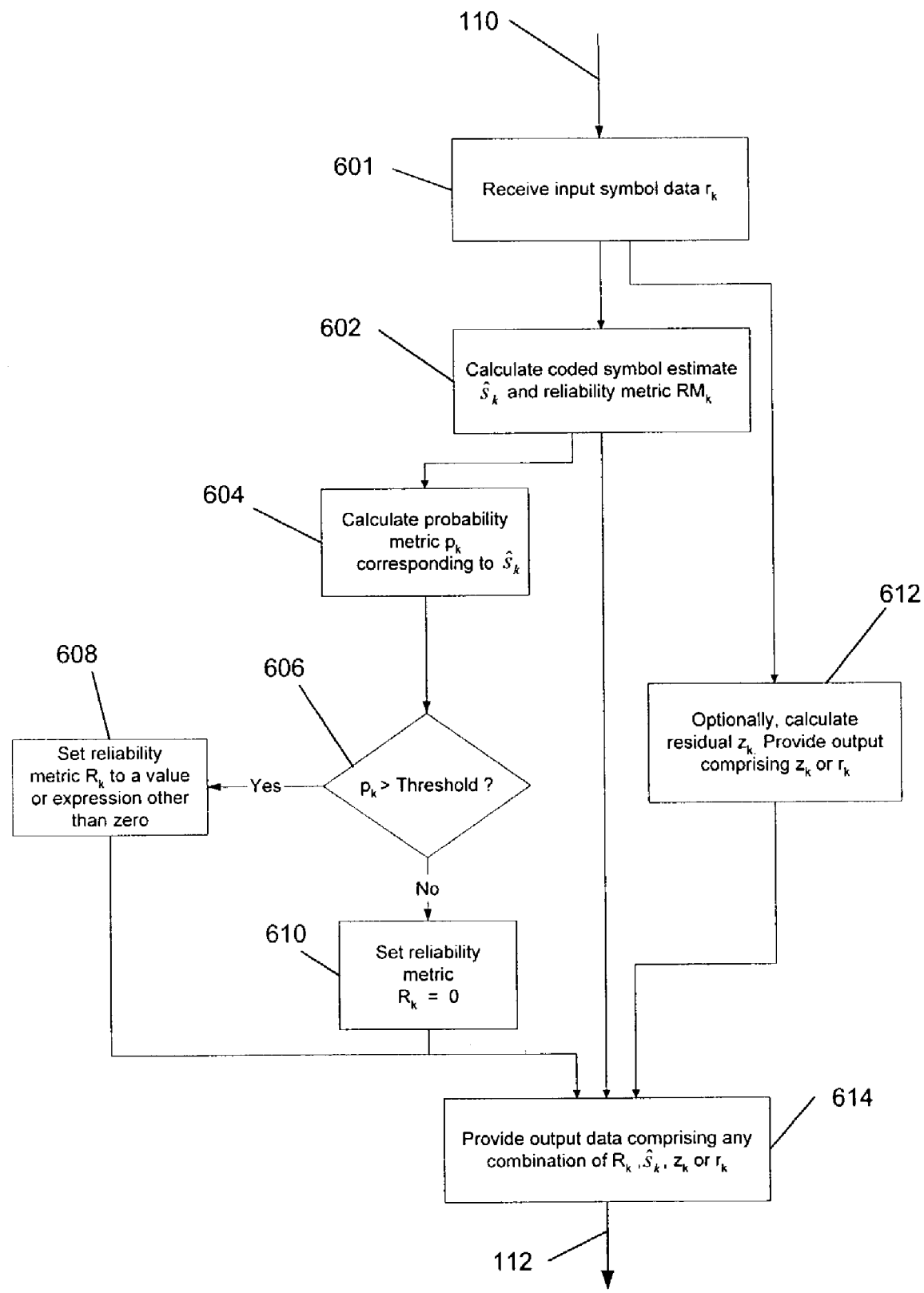
FIG. 6 is a flow diagram showing an embodiment of a method for pre-selecting symbol data in accordance with the present invention.

FIG. 6 shows one embodiment of a method for pre-selecting symbols. In step 601, data 110, representing received symbols $r_k$ are received by the symbol reliability device 104 (FIG. 1). In step 602, received symbol data $r_k$ are decoded by any device capable of producing soft symbol estimates, including, without limitation, a MAP decoder, a log-MAP decoder, a Soft-Input Soft-Output decoder, a Soft-Output Viterbi Algorithm decoder, a max-log MAP decoder, or similar devices. Decoding may also be performed by a Viterbi decoder where a reliability metric is a function of the best path metric minus the second-best path metric. Step 602 provides an estimated symbol $\hat{s}_k$ and a reliability metric $RM_k$.

Referring still to FIG. 6, at step 604 the reliability metric $RM_k$ is converted into a probability metric $p_k$. As one example, $RM_k$ may comprise the log-likelihood metric $LL_k(\hat{s}_k)$ calculated at step 210 of the method illustrated in FIG. 2. In this case, a probability metric $p_k$ is the linear probability resulting from the step 212 of the method shown in FIG. 2. Other reliability and probability metrics may also be used in accordance with the teachings herein. In some examples the reliability and probability metrics may be identical.

Referring again to FIG. 6, at the step 606, the probability metric is compared to a suitably chosen threshold T. In one embodiment, the threshold T comprises the minimum acceptable value below which data is considered unusable. For example, when $p_k$ is a linear probability metric ranging from 0 to 1, inclusive, then the threshold T=½ is the level at which all other data symbols are as probable as the estimated symbol. If the probability metric is not greater than the threshold T, then the method proceeds to a step 610 whereat the reliability weight factor $R_k$ is set equal to 0. If $p_k$ is greater than T, then the method proceeds to a step 608 whereat $R_k$ is set equal to a value or expression other than zero. Examples include, without limitation, the following values and expressions: $R_k=1$; $R_k=p_k$; and $R_k=(p_k-T)(1-T)$.

Referring still to FIG. 6, at a step 612, a residual $z_k$, relating to the difference the received symbol $r_k$ and a corresponding estimated symbol $\hat{s}_k$, may optionally be computed. Data output by the method at step 612 may comprise $z_k$, $r_k$, neither, or both.

At step 614, data processed by the preceding steps are provided as output data 112 comprising any combination of the following: $\hat{s}_k$, $R_k$, $z_k$, $r_k$.

Figure 7:
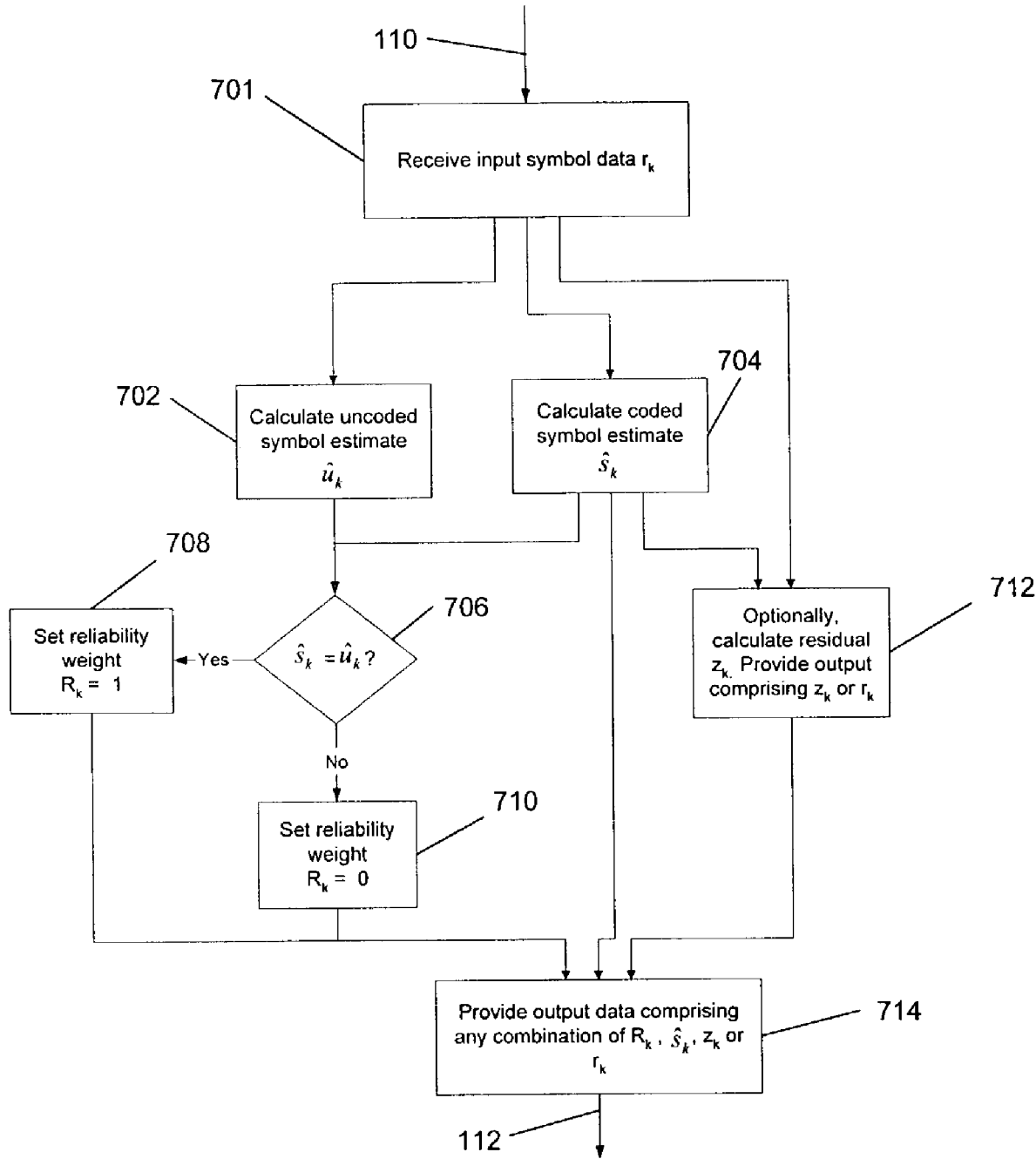
FIG. 7 is a flow diagram showing another embodiment of a method for pre-selecting symbol data in accordance with the present invention.

FIG. 7 shows a flow diagram of another embodiment of the present inventive symbol pre-selection method. Many of the steps of the method shown in FIG. 7 are identical to those described above with reference to the method shown in FIG. 6, and therefore these steps are not described further herein. In step 701, data 110 representing received symbols $r_k$ are received. At a step 702, data 110 are used to derive an "uncoded" symbol estimate $\hat{u}_k$ by selecting the symbol in the coding constellation that is closest to the symbol data $r_k$.

Figure 8:
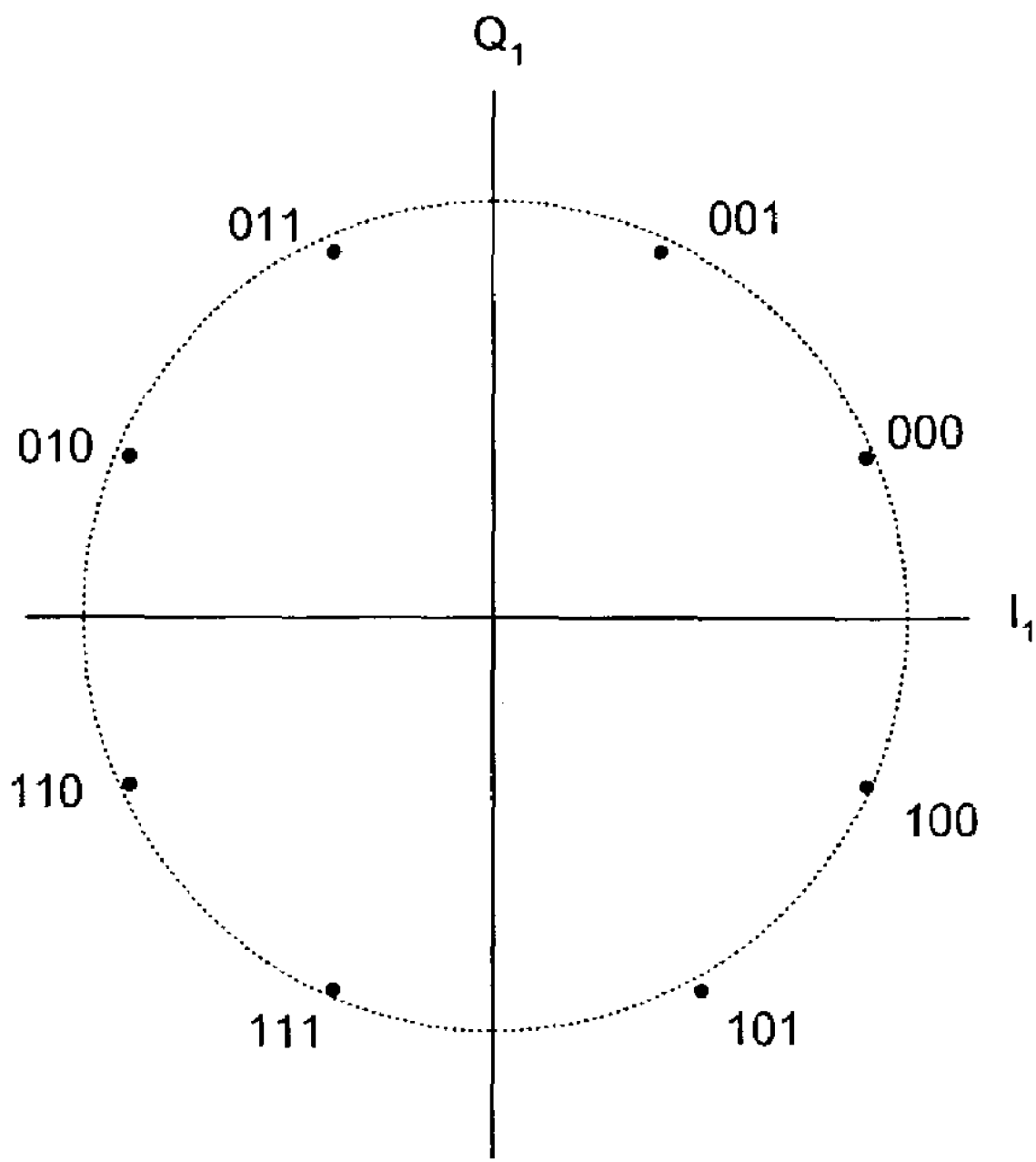
FIG. 8 illustrates an 8-PSK coding constellation.

Relating to an example of a method for determining uncoded symbol estimate $\hat{u}_k$, FIG. 8 illustrates an 8-PSK coding constellation with eight possible symbols comprising a 3-tuple of bits $(y_2^i, y_1^i, y_0^i)$, i=0, 1. Each 8-PSK symbol is a quadrature symbol having I and Q components. For PSK modulation, such symbols may also be represented solely in terms of phase. The table below, corresponding to the constellation of FIG. 8, shows one method for mapping phase into a 3-tuple of bits:

| 3-tuple $(y_2^i, y_1^i, y_0^i)$, i = 0,1 | 8-PSK symbol |
|---|---|
| (0, 0, 0) | π/16 |
| (0, 0, 1) | 3π/16 |
| (0, 1, 1) | 5π/16 |
| (0, 1, 0) | 7π/16 |
| (1, 1, 0) | 9π/16 |
| (1, 1, 1) | 11π/16 |
| (1, 0, 1) | 13π/16 |
| (1, 0, 0) | 15π/16 |

The phase of a received datum $r_k$ ideally would correspond exactly to an 8-PSK symbol. However, due to noise, the phase of a received symbol $r_k$ will generally be inaccurate. The estimated symbol $\hat{u}_k$ is selected by choosing the symbol having a phase that most closely approximates the received symbol $r_k$ without regard to the coding information utilized during the step 704 of FIG. 7. One of ordinary skill in the symbol reliability design arts shall recognize that this is only one example of many for which the teachings of the present disclosure are applicable.

Referring again to FIG. 7, at the step 704, data 110, comprising symbols $r_k$, are decoded by any device including, without limitation, a MAP decoder, a log-MAP decoder, a Soft-Input Soft-Output decoder, a Soft-Output Viterbi Algorithm decoder, a max-log MAP decoder, a Viterbi decoder, or similar decoding devices. STEP 704 outputs "coded" symbol estimate $\hat{s}_k$.

The method proceeds from the step 704 to a step 706 as shown in FIG. 7. At step 706, the uncoded symbol estimate $\hat{u}_k$ is compared to a coded symbol estimate $\hat{s}_k$. If $\hat{s}_k$ and $\hat{u}_k$ are the same symbol, then the method proceeds to a step 708 whereat a reliability weight $R_k$ is set equal to 1. If $\hat{s}_k$ and $\hat{u}_k$ are not the same symbol, the method proceeds to a step 710 whereat the reliability weight $R_k$ is set equal to 0.

Still referring to FIG. 7, at a step 712 a residual value $z_k$, relating to the difference between a received symbol $r_k$ and a corresponding estimated symbol $\hat{s}_k$ may optionally be computed. Data output by the step 712 may comprise $z_k$, $r_k$, neither, or both.

At the step 714 of FIG. 7, data produced by the previous steps are provided as output data 112 comprising any combination of the following: $\hat{s}_k$, $R_k$, $z_k$, $r_k$. An exemplary application for all embodiments of the present teachings may include, without limitation, the use of estimated symbols, reliability weight factors and residuals for carrier phase tracking systems as taught in the patent applications incorporated above, especially the two applications entitled "SYSTEM FOR CARRIER PHASE TRACKING OF CODED SYMBOLS USING RELIABILITY METRICS FOR SYMBOL ESTIMATES," (Ser. No.: 09/715,877) "ITERATIVE CARRIER PHASE TRACKING SYSTEM," (Ser. No.: 09/738,896) and "SYSTEM FOR CARRIER PHASE TRACKING OF MULTI-DIMENSIONAL CODED SYMBOLS" (Ser. No.: 09/738,896).

Exemplary Application to a System for Carrier Phase Tracking

Figure 9:
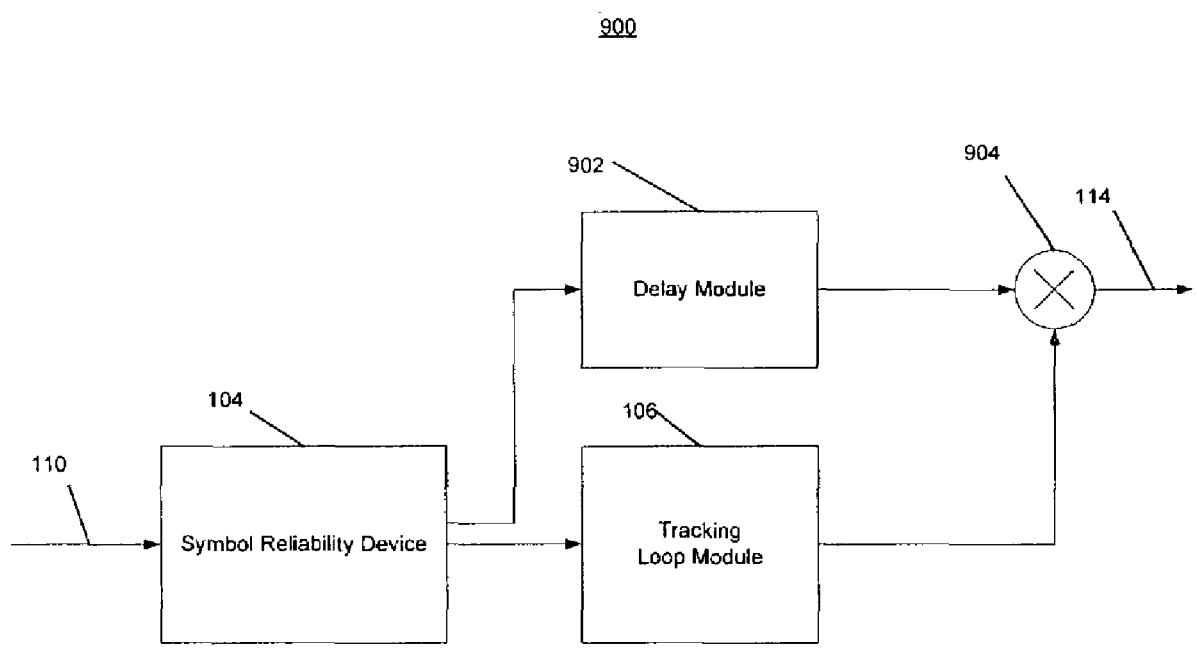
FIG. 9 is a simplified block diagram of a phase tracking system incorporating a symbol reliability device made in accordance with the present invention.

FIG. 9 shows a simplified block diagram of one embodiment of a carrier phase tracking system incorporating the symbol reliability determination and symbol pre-selection methods of the present invention. This embodiment employs a feed-forward structure to determine the de-rotation phase $\theta$. As shown in FIG. 9, data 110, comprising received symbol data $r_k$, are received by the symbol reliability device 104. The symbol reliability device 104 determines an estimated symbol $\hat{s}_k$ and a corresponding reliability weight $R_k$ associated with the data $r_k$ in accordance with the inventive symbol reliability methods described above.

The estimated symbol $\hat{s}_k$ and associated reliability weight $R_k$ are conveyed to the tracking loop module 106. The tracking loop module 106 determines a residual $z_k$ between the received symbol $r_k$ and its estimate $\hat{s}_k$. Alternatively, the residual $z_k$ may be computed within the symbol reliability device 104 and provided as input to the tracking loop module 106. In one embodiment, the residual $z_k$ may comprise a phase residual. The reliability weight $R_k$ for the estimate is used to weight the residual $z_k$. A de-rotation phase $\theta$ is determined responsive to the weighted residual $z_k$. Optionally, one or more previous weighted residuals and one or more previous de-rotation phases may be used in this process. One example of how a de-rotation phase may be computed by a phase tracking module is described below.

Referring again to FIG. 9, the received symbol $r_k$ is provided to the delay module 902 by the system reliability device 104, or optionally by an alternate data route (not shown) that conveys the received symbol data $r_k$ directly from received data 110 to the delay module 902. The delay module 902 compensates for any processing delays caused by the system reliability device 104 and the tracking loop module 106. Although the delay module 902 is shown in FIG. 9 as a separate processing block, it can be incorporated into either the system reliability device 104 or the phase tracking module 106. The delay module 902 provides delayed received symbol $r_k$ data to the symbol de-rotator 904.

The symbol de-rotator 904 de-rotates the received symbol $r_k$ by the de-rotation phase $\theta$ in accordance with data received from the tracking loop module 106. In one implementation, the symbol de-rotator 904 comprises a modulator. In this embodiment, the modulator de-rotates a symbol by multiplying a quadrature baseband signal that includes the received symbol $r_k$ by a complex exponential $e^{-j\theta}$. The delay module 902 ensures proper synchronization of this de-rotation process. In particular, the delay module 902 compensates for delays introduced by the symbol reliability device 104 and the tracking loop module 106. The delay module 902 thereby ensures a proper match at the de-rotator 904 between the received symbol $r_k$ and the de-rotation phase that corresponds to the received symbol. The de-rotated received symbol $r_k$ output by the de-rotator 904 is provided as output data 114 for further processing. The process may be repeated for subsequent symbols.

In one example, the tracking loop 106 operates in accordance with the following mathematical expression:

$$\theta_k = \sum_{i=1}^{N} a_i \cdot \theta_{k-i} + \sum_{i=0}^{M-1} b_i \cdot R_{k-i} \cdot z_{k-i}$$

In this expression, $\theta_k$ comprises the de-rotation phase at time k; $\theta_{k-i}$ represents a previous value of the de-rotation phase at time k−I; $a_i$ is a coefficient applied to $\theta_{k-i}$; $z_{k-i}$ is a residual derived from $r_{k-i}$, the (k−i)th received symbol and $\hat{s}_{k-i}$, the estimate of that symbol; $R_{k-i}$ is the reliability weight for the estimate of the (k−i)th symbol; $b_i$ is a coefficient applied to $R_{k-i} \bullet z_{k-i}$; and N and M are non-negative integers. In one embodiment, the residual $z_{k-i}$ is $e_{k-i}$, the phase residual between $r_{k-i}$ and $\hat{s}_{k-i}$. In another embodiment, the residual $z_{k-i}$ is the component of $r_{k-i}$ orthogonal to $\hat{s}_{k-i}$.

Other Uses and Applications

The example above illustrates the use of symbol estimation for phase tracking, which relates to the more general concepts of demodulation tracking. Demodulation tracking is performed to adjust and optimize the demodulation process, and it includes operations such as equalization, phase noise tracking, Automatic Frequency Control (AFC), and Automatic Gain Control (AGC). In general, the present symbol reliability determination and symbol pre-selection methods described herein can be applied to all operations relating to demodulation tracking, adjustment, and optimization.

For example, and more specifically, the present inventive methods can be employed in operations that compensate for carrier frequency changes. Frequency is the derivative of phase, therefore, for systems that incorporate second-order (i.e., error-integrating) phase tracking loops, frequency errors can be more optimally compensated using the symbol estimation methods of the present invention.

Further, the present inventive symbol reliability determination methods can be employed to compensate for channel multipath changes via the equalization process.

The present invention can also be used to compensate for signal strength changes via AGC.

The present invention can also be used in the optimization of symbol timing changes.

All of the above applications may employ methods that compare symbol estimates to received data to determine offsets, and that implement compensation loops to drive the observed offsets to zero.

For example, in equalizer devices, exemplary applications of the present invention comprise the following:

(1) Implementation of symbol reliability methods may be used within an LMS or RLS algorithm used to update the equalizer taps (i.e., within the channel estimate innovation process). When a symbol reliability is low, as determined in accordance with the present inventive techniques, response to the error signal may be reduced.

(2) Implementation of the present inventive symbol reliability methods can be used within the decision feedback portion of a decision feedback equalizer (i.e., within the compensation process).

For timing loop processes, the present inventive symbol reliability methods may be implemented following the cross-correlation process used to determine optimal timing. In accordance with this approach, a segment of the received data is cross-correlated with a segment of the estimated data, and the optimal timing occurs where the cross-correlation is strongest. Because the correlation function can be interpolated between points using an interpolation filter, the timing offset can be estimated with very good precision, even with symbol-spaced samples. When a symbol has a low level of reliability, response to the error signal (i.e., the estimated timing offset derived from the correlation) is scaled by an attenuation factor, in accordance with the inventive methods described above. Effectively, this instantaneously reduces the response speed of the timing tracking loop. However, the response speed is reduced because the data that the timing track loop may be using to estimate offsets is suspect.

For Automatic Gain Control (AGC), the present inventive methods can be used to track and compensate magnitude differences between received and estimated data. When a symbol datum reliability is low, the response relating to that datum may be reduced, and the tracking loop speed is reduced.

In light of the examples above, those of ordinary skill in the data processing and communication arts shall recognize that the present invention can be broadly and generally applied to data signals comprising symbol data processed via demodulation tracking.

A computer readable medium which tangibly embodies the method steps of any of the embodiments herein may be used in accordance with the present invention. For example, the method steps may be embodied as a series of computer executable instructions stored on a the computer readable medium. Such a medium may include, without limitation, RAM, ROM, EPROM, EEPROM, floppy disk, hard disk, CD-ROM, etc. The disclosure also includes the method steps of any of the foregoing embodiments synthesized as digital logic in an integrated circuit, such as a Field Programmable Gate Array, or Programmable Logic Array, or other integrated circuits that can be fabricated or modified to embody computer instructions.

A number of embodiments of the present invention have been described. Nevertheless, it will be understood that various modifications may be made without departing from the scope of the invention. For example, the methods of the present invention can be executed in software or hardware, or a combination of hardware and software embodiments. As another example, it should be understood that the functions described as being part of one module may in general be performed equivalently in another module. As yet another example, steps or acts shown or described in a particular sequence may generally be performed in a different order, except for those embodiments described in a claim that include a specified order for the steps.

Accordingly, it is to be understood that the invention is not limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances the intended distinction between claim features and description features is underscored by using slightly different terminology.

What is claimed is:

1. A method of processing received symbol data $r_k$ within a communications system, comprising:
   (a) decoding the received symbol data $r_k$ to produce a soft symbol estimate $\hat{s}_k$ of the received symbol data $r_k$;
   (b) computing a reliability metric $RM_k$ associated with the soft symbol estimate $\hat{s}_k$ computed in step (a);
   (c) computing a probability metric $p_k$ based upon the reliability metric $RM_k$ computed in step (b);
   (d) setting a reliability weight $R_k$ associated with and corresponding to the soft symbol estimate $\hat{s}_k$ to zero if the probability metric computed in the step (c) is less than or equal to a predetermined threshold value T;
   (e) setting the reliability weight $R_k$ to a non-zero value if the probability metric computed in the step (c) is greater than the predetermined threshold value T;
   (f) calculating a residual value $z_k$ relating to a difference between the soft symbol estimate $\hat{s}_k$ and the received symbol data $r_k$; and
   (g) generating output data comprising any of the soft symbol estimate $\hat{s}_k$, the reliability weight, the residual value and the received symbol data $r_k$.

2. The method of claim 1, wherein the soft symbol estimate $\hat{s}_k$ produced in the step (a) is generated by log maximum a posteriori (log-MAP) decoding the received symbol data.

3. The method of claim 2, wherein the log-MAP decoding the received symbol data comprises computing log-likelihood (LL) values for all symbols corresponding to the received symbol data $r_k$.

4. The method of claim 3, wherein a log-likelihood value $LL_k(s)$ for a symbol s at a time k is computed in accordance with the following equation:

$$LL_k(s) = \text{MAX}^*_{\forall i \text{ that imply release of symbol } s}(\lambda_k^i) - \text{MAX}^*_{\forall i}(\lambda_k^i).$$

5. The method of claim 4, wherein the soft symbol estimate $\hat{s}_k$ of the received symbol data at the time k comprises the soft symbol estimate $\hat{s}_k$ having the largest LL value.

6. The method of claim 5, wherein the soft symbol estimate $\hat{s}_k$ having the largest LL value is computed in accordance with the equation:

$$LL_k(\hat{s}_k) = \text{MAX}_{\forall s}(LL_k(s)).$$

7. The method of claim 6, wherein the reliability metric $RM_k$ of step (b) comprises the largest log-likelihood value $LL_k(\hat{s}_k) = \text{MAX}_{\forall s}(LL_k(s))$.

8. The method of claim 7, wherein the probability metric $p_k$ computed in step (c) is derived from the reliability metric $RM_k$ of claim 7, and wherein the probability metric $p_k$ comprises the linear probability for the symbol estimate $\hat{s}_k$ at time k.

9. The method of claim 8, wherein the linear probability for the symbol estimate $\hat{s}_k$ at time k is derived from the reliability metric $RM_k$ in accordance with the following equation: $P_k = e^{LL_k(\hat{s}_k)}$.

10. The method of claim 1, wherein the reliability metric is identical to the probability metric.

11. The method of claim 1, wherein the soft symbol estimate $\hat{s}_k$ produced in the step (a) is generated by a maximum a posteriori (MAP) decoder.

12. The method of claim 1, wherein the soft symbol estimate $\hat{s}_k$ produced in the step (a) is generated by a Soft-Input Soft-Output decoder.

13. The method of claim 1, wherein the soft symbol estimate $\hat{s}_k$ produced in the step (a) is generated by a Soft-Output Viterbi decoder.

14. The method of claim 1, wherein the soft symbol estimate $\hat{s}_k$ produced in the step (a) is generated by a Viterbi decoder and wherein the reliability metric is a function of a first best-path metric subtracted by a second best-path metric.

15. The method of claim 1, wherein the predetermined threshold value T comprises a minimum acceptable value below which the received symbol data is unusable.

16. The method of claim 15, wherein the probability metric $p_k$ comprises a linear probability metric ranging between 0 and 1, inclusive, and wherein the threshold T=½ comprises a level at which all data symbols are as probable as the soft symbol estimate produced at step (a).

17. The method of claim 1, wherein the reliability weight $R_k$ is set equal to 1 during step (e) when the probability metric is greater than the threshold value T.

18. The method of claim 1, wherein the reliability weight $R_k$ is set equal to the probability metric $p_k$ during step (e) when the probability metric is greater than the threshold value T.

19. The method of claim 1, wherein the reliability weight $R_k$ is set equal to $(p_k-T)/(1-T)$ when the probability metric is greater than the threshold value T.

20. A method of processing received symbol data $r_k$ within a communications system, comprising:

(a) decoding the received symbol data $r_k$ to produce a soft symbol estimate $\hat{s}_k$ of the received symbol data $r_k$;

(b) computing an uncoded symbol estimate $\hat{u}_k$ by selecting a symbol in a coding constellation closest to the received symbol data $r_k$;

(c) comparing the uncoded symbol estimate $\hat{u}_k$ computed in step (b) to the soft symbol estimate $\hat{s}_k$ produced in step (a);

(d) setting a reliability weight $R_k$, associated with and corresponding to the soft symbol estimate $\hat{s}_k$, to zero if the uncoded symbol estimate $\hat{u}_k$ is not identical to the soft symbol estimate $\hat{s}_k$;

(e) setting the reliability weight $R_k$ to 1 if the uncoded symbol estimate $\hat{u}_k$ is identical to the soft symbol estimate $\hat{s}_k$;

(f) calculating a residual value $z_k$ relating to a difference between the soft symbol estimate $\hat{s}_k$ and the received symbol data $r_k$; and (g) generating output data comprising any of the soft symbol estimate $\hat{s}_k$, the reliability weight, the residual value and the received symbol data $r_k$.

21. The method of claim 20, wherein the step (b) of computing an uncoded symbol estimate $\hat{u}_k$ comprises selecting a symbol, in an PSK coding constellation, wherein the symbol has a phase most closely approximating the received symbol data $r_k$.

22. The method of claim 21, wherein the PSK coding constellation comprises an 8-PSK coding constellation, and wherein the 8-PSK coding constellation has eight possible symbols comprising a 3-tuple of bits $(y_2^i, y_1^i, y_0^i)$, wherein i=0, 1.

23. A carrier phase tracking system, comprising:

(a) a symbol reliability block adapted to receive symbol data $r_k$, wherein the symbol reliability block includes:

(1) a decoder producing a soft symbol estimate $\hat{s}_k$ of the received symbol data $r_k$;

(2) means for computing a reliability metric $RM_k$ associated with the soft symbol estimate $\hat{s}_k$;

(3) means for computing a probability metric $p_k$ based upon the reliability metric $RM_k$; and (4) means for determining a reliability weight $R_k$ associated with and corresponding to the soft symbol estimate $\hat{s}_k$;

(b) a tracking loop block, coupled to the symbol reliability block, wherein the tracking loop block computes a residual value $z_k$ between the received symbol $r_k$ and the soft symbol estimate $\hat{s}_k$;

(c) a delay block, coupled to receive the received symbol data $r_k$ from the symbol reliability block, wherein the delay block compensates for processing delays created by the symbol reliability and tracking loop blocks, and wherein the delay block outputs delayed received symbol data; and (d) a symbol de-rotator, coupled to the delay and the tracking loop blocks, wherein the symbol de-rotator de-rotates the received symbol data $r_k$ by a de-rotation phase θ in accordance with input received from the tracking loop block.

24. The carrier phase tracking system of claim 23, wherein the residual value $z_k$ computed by the tracking loop block comprises a phase residual.

25. The carrier phase tracking system of claim 24, wherein reliability weight $R_k$ is used to weight the residual value $z_k$.

26. The carrier phase tracking system of claim 25, wherein the de-rotation phase θ is determined responsive to the weighted residual value $z_k$.

27. The carrier phase tracking system of claim 23, wherein the symbol de-rotator comprises a modulator.

28. The carrier phase tracking system of claim 27, wherein the modulator de-rotates a symbol by multiplying a quadrature baseband signal by a complex exponential $e^{-j\theta}$, and wherein the quadrature baseband signal includes the received symbol data $r_k$.

29. The carrier phase tracking system of claim 24, wherein the tracking loop block generates the de-rotation phase $\theta_k$ at a time k in accordance with the equation:

$$\theta_k = \sum_{i=1}^{N} a_i \cdot \theta_{k-i} + \sum_{i=0}^{M-1} b_i \cdot R_{k-i} \cdot z_{k-i},$$

wherein $\theta_k$ comprises a de-rotation phase at a time k, $\theta_{k-i}$ comprises a previous value of the de-rotation phase at a time k–i, $a_i$ comprises a coefficient applied to $\theta_{k-i}$, $z_{k-i}$ comprises a residual value derived from $r_{k-i}$, wherein $r_{k-i}$ comprises the (k–i)th received symbol and $\hat{s}_{k-i}$ comprises an estimate of the (k–i)th received symbol, and wherein $R_{k-i}$ comprises a reliability weight for the estimate of the (k–i)th symbol, wherein $b_i$ comprises a coefficient applied to $R_{k-i} \bullet z_{k-i}$, and wherein N and M comprise non-negative integers.

30. The carrier phase tracking system of claim 29, wherein the residual value $z_{k-i}$ comprises a phase residual between $r_{k-i}$ and $\hat{s}_{k-i}$, and wherein the residual value $z_{k-i}$ comprises phase residual $e_{k-i}$.

31. The carrier phase tracking system of claim 30, wherein the residual value $z_{k-i}$ comprises a component of $r_{k-i}$ orthogonal to $\hat{s}_{k-i}$.

32. An apparatus processing received symbol data $r_k$ in a communications system, comprising:
 (a) means for decoding the received symbol data $r_k$ to produce a soft symbol estimate $\hat{s}_k$ of the received symbol data $r_k$;
 (b) means for computing a reliability metric $RM_k$ associated with the soft symbol estimate $\hat{s}_k$;
 (c) means for computing a probability metric $p_k$ based upon the reliability metric $RM_k$;
 (d) means for determining a reliability weight $R_k$ associated with and corresponding to the soft symbol estimate $\hat{s}_k$, wherein the reliability weight determining means sets the reliability weight $R_k$ to zero if the probability metric is less than or equal to a predetermined threshold value T, and wherein the reliability weight determining means sets the reliability weight $R_k$ to a non-zero value if the probability metric is greater than the predetermined threshold value T; and
 (e) means for computing a residual value $z_k$ relating to a difference between the soft symbol estimate $\hat{s}_k$ and the received symbol data $r_k$.

33. The apparatus of claim 32, wherein the apparatus is used within a receiver to adjust and optimize demodulation of received signals.

34. The apparatus of claim 33, wherein the demodulation of received signals includes demodulation tracking, adjustment and optimization processes.

35. An apparatus processing received symbol data $r_k$ in a communications system, comprising:
 (a) a decoder, wherein the decoder outputs a soft symbol estimate $\hat{s}_k$ of the received symbol data $r_k$; and
 (b) a symbol reliability processing block having an input coupled to the decoder output, wherein the processing block produces a reliability metric $RM_k$ associated with the soft symbol estimate $\hat{s}_k$, and wherein the processing block computes a probability metric $p_k$ based upon the reliability metric $RM_k$, and wherein the processing block determines a reliability weight $R_k$ associated with and corresponding to the soft symbol estimate $\hat{s}_k$, wherein the reliability weight $R_k$ is set to zero if the probability metric is less than or equal to a predetermined threshold value T, and wherein the reliability weight $R_k$ is set to a non-zero value if the probability metric is greater than the predetermined threshold value T, and wherein the processing block computes a residual value $z_k$ relating to a difference between the soft symbol estimate $\hat{s}_k$ and the received symbol data $r_k$.

36. A receiver in a data communications system, comprising:
 (a) a demodulator, wherein the demodulator receives modulated channel symbol data transmitted over a communications channel and outputs demodulated data comprising received symbol data $r_k$;
 (b) a decoder, coupled to the demodulator, wherein the decoder outputs a soft symbol estimate $\hat{s}_k$ of the received symbol data $r_k$;
 (c) a symbol reliability device having an input coupled to the decoder output, wherein the device produces a reliability metric $RM_k$ associated with the soft symbol estimate $\hat{s}_k$, and wherein the device computes a probability metric $p_k$ based upon the reliability metric $RM_k$, and wherein the device determines a reliability weight $R_k$ associated with and corresponding to the soft symbol estimate $\hat{s}_k$, wherein the reliability weight $R_k$ is set to zero if the probability metric is less than or equal to a predetermined threshold value T, and wherein the reliability weight $R_k$ is set to a non-zero value if the probability metric is greater than the predetermined threshold value T, and wherein the device computes a residual value $z_k$ relating to a difference between the soft symbol estimate $\hat{s}_k$ and the received symbol data $r_k$; and
 (d) a tracking loop block, coupled to the symbol reliability device, wherein the tracking loop block compensates for variations in carrier signal phase responsive to the symbol reliability device.

37. A computer readable medium encoded with a computer program executable by a general purpose computer, wherein the program is capable of processing data signals in a receiver circuit, the computer program comprising:
 (a) a first set of instructions for decoding received symbol data $r_k$ to produce a soft symbol estimate $\hat{s}_k$ of the received symbol data $r_k$;
 (b) a second set of instructions for computing a reliability metric $RM_k$ associated with the soft symbol estimate $\hat{s}_k$;
 (c) a third set of instructions for computing a probability metric $p_k$ based upon the reliability metric $RM_k$;
 (d) a fourth set of instructions for setting a reliability weight $R_k$ associated with and corresponding to the soft symbol estimate $\hat{s}_k$ to zero if the probability metric is less than or equal to a predetermined threshold value T, and for setting the reliability weight $R_k$ to a non-zero value if the probability metric is greater than the predetermined threshold value T;
 (e) a fifth set of instructions for computing a residual value $z_k$ relating to a difference between the soft symbol estimate $\hat{s}_k$ and the received symbol data $r_k$; and
 (f) a sixth set of instructions for generating output data comprising any of the soft symbol estimate $\hat{s}_k$, the reliability weight, the residual value and the received symbol data $r_k$.

38. A communication system comprising:
 (a) at least one transmitter; and
 (b) at least one receiver comprising the receiver as set forth in claim 36.

39. The communication system as set forth in claim 38, wherein the communication system further comprises a television operatively coupled to the at least one receiver.

40. The communication system as set forth in claim 39, wherein the communication system further comprises a television operatively coupled to the at least one receiver and a personal recorder.

41. The communication system as set forth in claim 40, wherein the communication system further comprises a set-top box operatively coupled to the at least one receiver.

42. The communication system as set forth in claim 41, wherein the communication system further comprises a personal digital assistant (PDA) operatively coupled to the at least one receiver.

43. The communication system as set forth in claim 41, wherein the communication system further comprises computer operatively coupled to the at least one receiver.

* * * * *